UNITED STATES PATENT OFFICE.

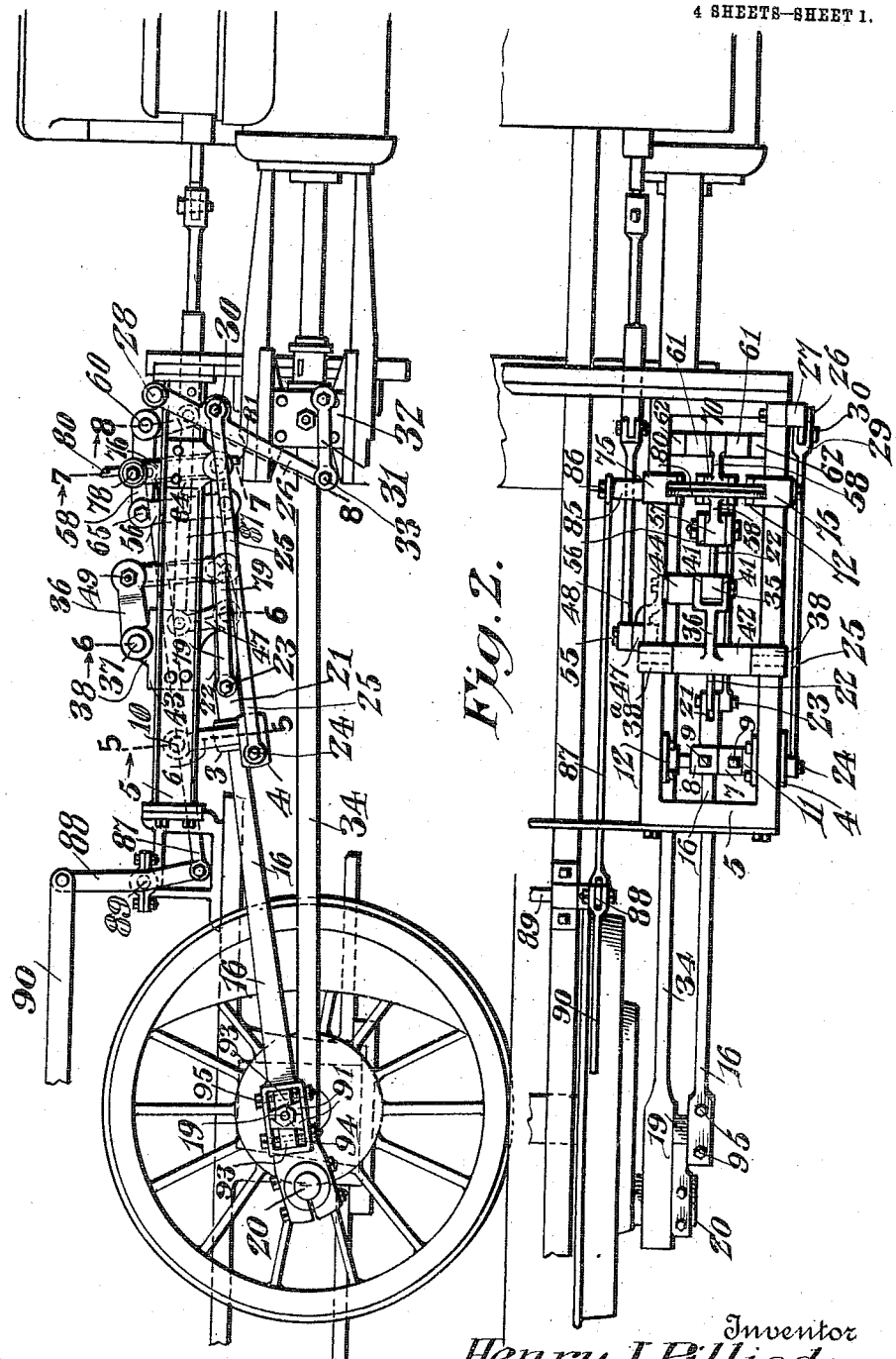

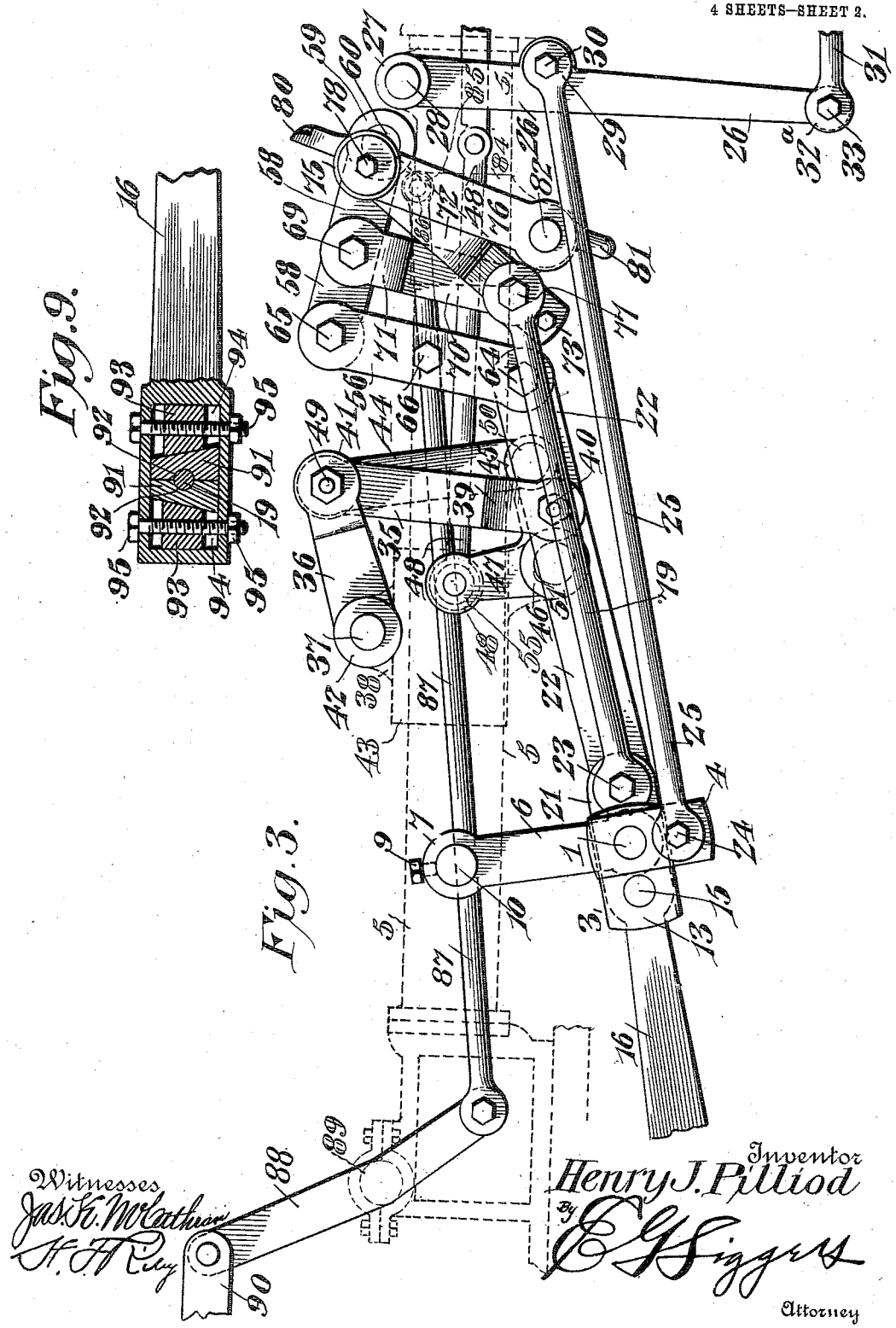

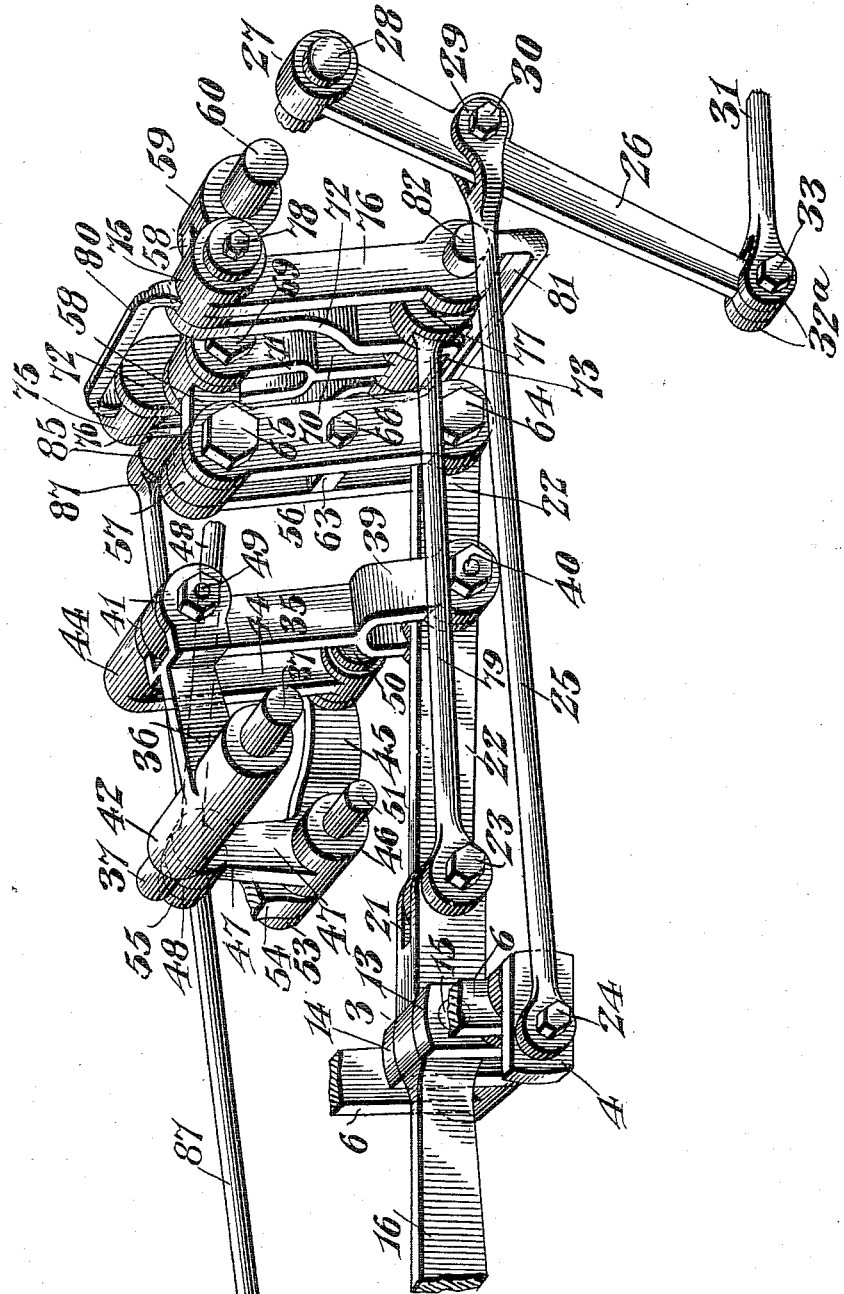

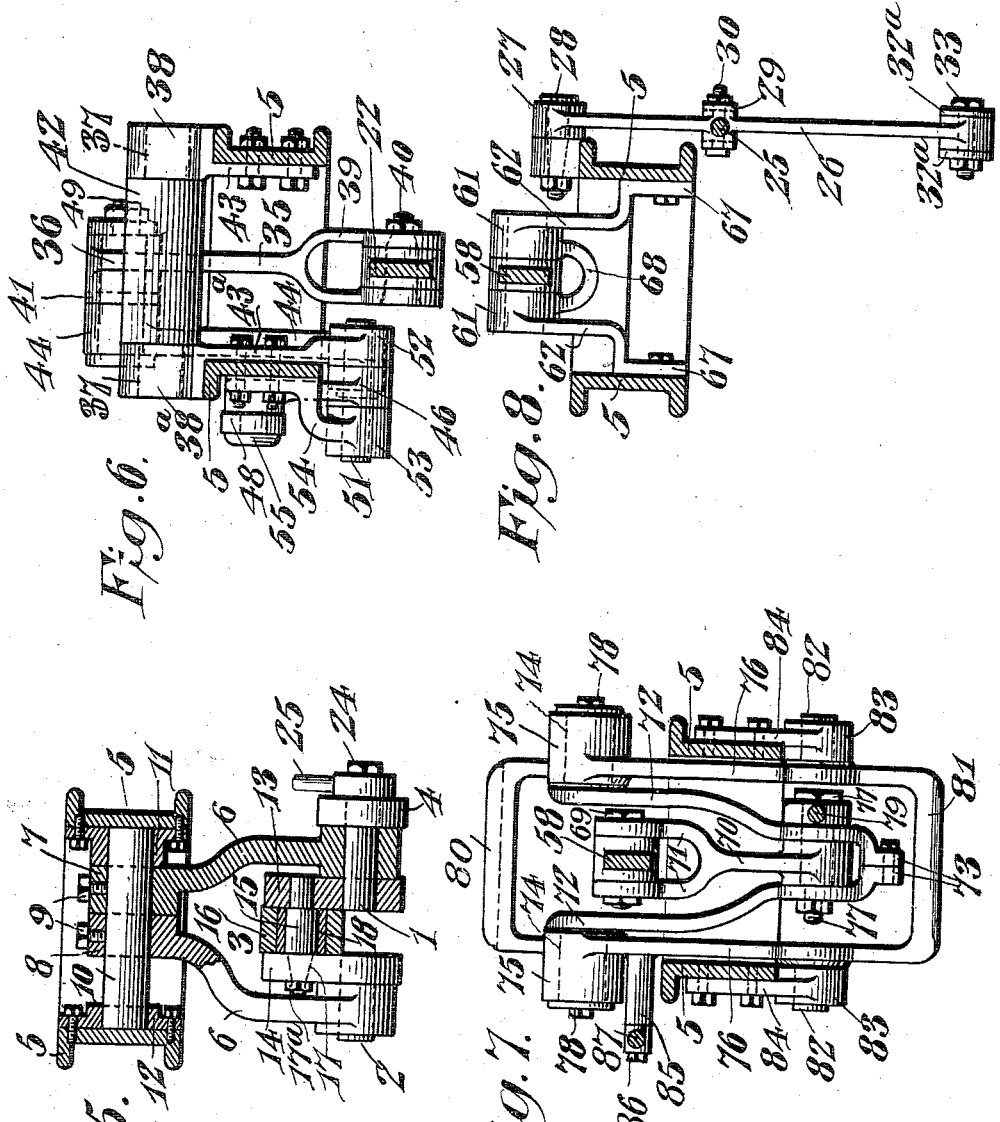

HENRY J. PILLIOD, OF CHICAGO, ILLINOIS, ASSIGNOR TO THE PILLIOD BROTHERS COMPANY, OF TOLEDO, OHIO.

LOCOMOTIVE VALVE-GEAR.

982,989.     Specification of Letters Patent.     Patented Jan. 31, 1911.

Application filed May 2, 1910. Serial No. 558,822.

*To all whom it may concern:*

Be it known that I, HENRY J. PILLIOD, a citizen of the United States, residing at Chicago, in the county of Cook and State of Illinois, have invented a new and useful Locomotive Valve-Gear, of which the following is a specification.

The invention relates to improvements in valve gears for locomotives.

The object of the present invention is to improve the construction of variable cut-off and reversing valve gears for locomotives, and to provide a simple and efficient valve gear, adapted to correct the evils of valve motion, viz., the unequal port opening, cut-off and release due to the angularity of the eccentric arm, and to produce an equal travel of the valve at the backward and forward movements thereof and a uniform distribution of steam.

Another object of the invention is to equip the valve gear with an imparting motion device, which will secure a uniform rotative speed for actuating the eccentric arm and which will compensate for vibration and lateral motion of an engine and prevent fatal effect of such motions on the valve gear.

With these and other objects in view, the invention consists in the construction and novel combination of parts hereinafter fully described, illustrated in the accompanying drawings, and pointed out in the claims hereto appended.

In the drawings:—Figure 1 is a side elevation of a portion of a locomotive provided with a valve gear, constructed in accordance with this invention. Fig. 2 is a plan view of the same. Fig. 3 is an enlarged elevation of the valve gear. Fig. 4 is an enlarged perspective view of the same. Fig. 5 is a transverse sectional view, taken substantially on the line 5—5 of Fig. 1. Fig. 6 is a transverse sectional view on the line 6—6 of Fig. 1. Fig. 7 is a transverse sectional view on the line 7—7 of Fig. 1. Fig. 8 is a transverse sectional view on the line 8—8 of Fig. 1. Fig. 9 is a detail sectional view, illustrating the construction for adjusting the eccentric rod.

Like numerals of reference designate corresponding parts in all the figures of the drawings.

The specification is a disclosure of one form of the invention, while the claims define the actual scope of the invention.

In the embodiment of the invention illustrated in the accompanying drawings, the valve gear is equipped with an imparting motion device comprising a central pivot or shaft composed of two sections 1 and 2, and equipped with two cranks 3 and 4, arranged at an angle of ninety degrees. The sections 1 and 2 of the central shaft or pivot are hung from the gear frame 5 by a hanger 6, arranged at an angle of ninety degrees to the line of motion, and adapted to swing longitudinally to compensate for vibration and lateral motion of the engine to prevent such motion from fatally affecting the operation of the valve. The hanger 6 is composed of two sides or links, having their upper ends 7 and 8 fitted together and rigidly secured by set screws 9, or other suitable fastening devices, to a horizontally disposed transversely arranged pivot 10. The terminals of the pivot 10 are arranged in bearings of plates 11 and 12, secured by screws, or other suitable fastening devices to the inner faces of the sides of the gear frame 5. The pivot 10 partially rotates in the bearings of the plates 11 and 12 when the hanger oscillates. The sides or links of the hanger 6 are laterally bent or off-set at an intermediate point to space their lower portions to receive the crank 3, which is composed of two arms 13 and 14, rigidly secured to the inner ends of the sections 1 and 2 of the central shaft or pivot, and connected by a crank pin 15, fixed to the arm 13 and provided with a central bearing portion to receive an eccentric rod 16, and having a tapered conical portion 17 to fit in a corresponding opening of the arm 14 of the crank 3. The crank pin 15 is threaded beyond the conical portion to receive a nut 17ª, which retains the arm 14 on the conical portion of the crank pin. The opening in the eccentric rod 16 for the reception of the crank pin 15 is preferably provided with a lining 18 of Babbitt metal, or other suitable material. The crank 4, which is arranged at right angles to the crank 3, is suitably fixed to the outer end of the section 1 of the central pivot or shaft.

The opening, which receives the crank pin 15, is arranged near the forward end of the eccentric rod, which is adjustably connected at its rear end with the return crank 19 of a main crank pin 20. The forward end 21 of the eccentric rod, which is extended in advance of the central pivot or shaft of the imparting motion device, is bifurcated to receive the rear end of an eccentric arm 22, connected to the bifurcated end of the eccentric rod by a pivot bolt 23. The crank 4 of the imparting motion device carries a crank pin or pivot 24, and is connected by a rod or link 25 with an oscillatory lever 26, pivoted at its upper end 27 to the frame of the valve gear by a pin or bolt 28. The forward end 29 of the link or rod 25 is bifurcated to straddle the oscillatory lever 26, and it is pivoted to the same at a point between the ends thereof by means of a bolt 30, piercing the sides of the bifurcation and an enlargement of the lever 26, as clearly shown in Figs. 3 and 4 of the drawings. The lower end of the depending oscillatory lever 26 is connected by a link 31 to the cross head 32 of the piston. The link 31, which is arranged in an approximately horizontal position, has its rear end 32$^a$ bifurcated for the reception of the lower end of the lever 26, and it is pivoted to the same by a bolt 33. The cross head of the piston is connected with the said crank pin 20 by a main rod 34 of the ordinary construction. While the piston and its crank 4 of the imparting motion device are traveling at their highest longitudinal speed, the main pin and the return crank are rounding their dead centers and are at their slowest longitudinal speed or motion, and a uniform rotative speed thereby results in the imparting motion device.

The eccentric arm is connected at an intermediate point by a link 35 with a rocker arm 36, located above the eccentric arm and pivoted at one end by a transverse rod or pin 37, mounted in suitable bearing brackets 38 and 38$^a$. The link 35 has its lower end 39 bifurcated to straddle the eccentric arm, and it is secured to the same by a pivot bolt 40, piercing the eccentric arm and the sides of the bifurcated end portion 39. The link 35 extends upwardly from the eccentric arm, and its upper end is pivoted in a fork or bifurcation 41 of the free end of the rocker arm, which is provided at its pivoted end with a transverse sleeve 42, extending across the space between the bearing brackets 38 and 38$^a$. The bearing brackets 38 and 38$^a$, which are mounted upon the sides of the gear frame, have depending attaching portions 43 and 43$^a$, bolted or otherwise secured to the inner faces of the sides of the said gear frame. The reciprocatory motion of the eccentric arm and the upward and downward movement of the same through the oscillatory means hereinafter described cause the pivot 40 to travel in an elliptical path. The free end of the rocker arm is connected by a downwardly extending link 44 with an arm 45 of a bell crank 46, which has its other arm 47 connected with the valve rod 48 of the locomotive. The upper end of the depending link 44 is pivoted to the rocker arm 36 at one side thereof by means of a pivot bolt 49, which also connects the link 35 with the free end of the rocker arm, and the bell crank arm 45, which is connected with the lower end of the link 44 by a pivot bolt 50, extends forwardly in an approximately horizontal position. The bell crank is mounted on a transverse pin 51, journaled in a bearing 52 of the attaching portion 43$^a$ of the bearing bracket 38$^a$, and in a bearing 53 of a bearing bracket 54, secured to the outer face of the adjacent side of the gear frame. The bearings 52 and 53 are spaced apart to receive the bell crank 46, and the arm 47 thereof is arranged in an upright position and is secured to the rear end of the valve rod by a suitable pivot 55. The bell crank 46 may be reversed to change the direction of motion to arrange the valve gear to suit either inside or outside admission valves.

The forward end of the eccentric arm is connected by a front link 56 with the free end 57 of a rocker arm 58, which is pivoted at its other end 59 by a transverse pin 60, mounted in bearings 61 of a bearing bracket 62. The front link 56 is composed of two sides or members spaced apart by a block 63 to receive the forward end of the eccentric arm and the free end of the rocker arm 58. The sides or members of the front link 56 are secured to the eccentric arm 22 and to the rocker arm 58 by pivot bolts 64 and 65, and the sides or members of the link 56 are secured to the spacing block 63 by a transverse bolt 66. The bearing bracket 62 is composed of two sides having lower attaching portions 67, and provided at the top with the bearing 61, spaced apart to receive the pivoted end of the front rocker arm 58, and connected at the bottom by an approximately U-shaped loop 68. The attaching portions 67 of the sides of the bearing brackets fit against the inner faces of the sides of the gear frame and are bolted, or otherwise secured to the same.

The front rocker arm is connected at an intermediate point by a pivot bolt 69 to the upper end of a radius link 70, having its upper portion 71 bifurcated to receive the front rocker arm and pivotally mounted at its lower end within and carried by a radius yoke 72. The radius yoke 72, which is approximately U-shaped, is composed of two sides or members, secured together at their lower ends 73 by a bolt, or other suitable fastening means, and provided at their upper ends with laterally extending pivots 74, arranged in opposite bearings 75 of a reversing yoke 76. The lower end of the link is arranged between the lower portions of the sides or members of the radius yoke 72, and is secured to the same by a pivot bolt 77.

The upper pivots or journals 74 of the radius yoke are secured in the bearings 75 by bolts 78, or other suitable fastening devices. The radius yoke is connected by a reciprocatory rod or member 79 with the front end of the eccentric rod, being pivoted to the latter by the bolt 23 and to the former by the pivot bolt 77. The reversing yoke is substantially oblong, being composed of spaced sides connected at the upper and lower ends by transverse top and bottom portions 80 and 81. The sides of the reversing yoke are provided at their lower portions with laterally extending pivots or journals 82, which are arranged in bearings 83 of brackets or plates 84, secured to the outer faces of the sides of the gear frame and depending therefrom, as clearly shown in Fig. 7 of the drawings. One side of the reversing yoke is provided with an integral horizontally projecting arm 85, to which is pivoted by a bolt 86 the forward end of a reach rod 87. The reach rod is connected at its rear end to the lower arm of an upright lever 88, provided at an intermediate point with a pivot 89, and connected at its upper end by a rod 90 with the ordinary reversing lever (not shown). The reversing yoke, the radius yoke and the radius link constitute a reverse or reversing mechanism, and is a modification of the Marshall reverse, and the radius yoke is adapted to be swung to either side of the vertical center to reverse the engine, and is adapted to be arranged at various points between its extreme positions to vary the cut-off.

The oscillation of the radius yoke through the radius link raises and lowers the front rocker arm and imparts vertical movement to the forward end of the eccentric arm, and the combined motions, the horizontal reciprocatory and the vertical cause the intermediate pivot 40 and the end pivot 64 to travel in elliptical paths. The intermediate pivot describes a perfect ellipse, that is an ellipse where there is an equal amount of travel on each side of the center line of motion, modified by the radius of the intermediate link, and the end pivot describes a very distorted or elongated ellipse and compensates for and dissipates the effects of the angularity of the eccentric arm 22. The eccentric arm 22 has angularity, while the eccentric rod travels in parallel owing to the imparting motion device. Heretofore when the valve actuating mechanism has been connected to the eccentric arm at a point intermediate of the ends thereof by a pivot traveling in an elliptical path, the forward end of the eccentric arm has always traveled in a fixed or true arc or arcuate path, and the ellipse described by the intermediate pivot connected with the valve actuating mechanism was always irregular, being greater on the top side of the ellipse than on the bottom, causing unequal valve travel and unequal distribution of steam. This evil was produced by connecting the forward end of the eccentric rod or arm directly to the radius link of a reverse of the Marshall type and has been corrected by the employment of the front rocker arm and the link connection, which produce the elliptical path of movement of the front end of the eccentric arm. An equal travel of the valve is thus secured during both strokes, producing uniform admission and release at each end of the cylinder and cut-off at equidistant points at each end thereof. Owing to the employment of the imparting motion device, the action of the valve is undisturbed and unaffected by vibration and lateral movement such as occurs in locomotive gears by reason of the yielding of the springs in running over inequalities of the track. The imparting motion device, which actuates the eccentric arm, secures perfect motion of uniform rotative speed and prevents such vibrations and lateral motion from affecting the transmission of motion to the valve gear, and the usual fatal effect of such vibration and lateral motion on the valve is prevented.

The rear end of the eccentric rod is adjustably connected with the return crank by an adjusting device comprising a pair of bearing members 91, provided with registering grooves 92 to form a bearing for the pin of the return crank, and tapered transversely of the eccentric rod to present outer angularly disposed faces to a pair of wedges 93. The eccentric rod is provided at its rear end with an oblong opening 94 in which the bearing blocks and the adjustable wedges are arranged. The wedges have angularly disposed inner faces, which fit the angularly disposed faces of the members of the bearing, and they have straight flat outer end faces, which fit against the end walls of the oblong opening of the eccentric rod. The bearing blocks or members and the adjusting blocks or wedges are positioned to arrange the eccentric rod in proper relation to the return crank and the crank shaft of the imparting motion device, and the wedges or adjusting blocks are secured in proper position by transverse bolts 95, engaging threaded openings of the adjusting blocks or wedges and equipped with nuts 96. The adjusting device enables the eccentric rod to be readily adjusted should the same be required. Any other suitable means, however, may be employed for this purpose.

Having thus fully described my invention, what I claim as new and desire to secure by Letters Patent, is:—

1. The combination with a crank axle, a piston connected therewith, a return crank, and an eccentric rod, of an imparting motion device including a rotary shaft having a plurality of crank elements, one crank element being connected with the eccentric rod, an oscillatory lever connected with the piston, and means for connecting the oscillatory lever with the other crank element, and a valve gear actuated by the eccentric rod.

2. The combination with a crank axle, a piston connected therewith, a return crank, and an eccentric rod, of an imparting rotary device including a rotary shaft provided with a pair of crank elements arranged at right angles to each other, one of the crank elements being connected with the eccentric rod, an oscillatory lever connected with the piston, means for connecting the oscillatory lever with the other crank element, and a valve gear actuated by the eccentric rod.

3. The combination with a crank axle, a piston connected therewith, a return crank, and an eccentric rod, of an imparting motion device including a rotary shaft having a plurality of crank elements, one crank element being connected with the eccentric rod, an oscillatory link supporting the rotary shaft, a lever connected with the piston, and means for connecting the lever with the other crank of the rotary shaft, and a valve gear actuated by the eccentric rod.

4. The combination with a crank axle, a piston connected therewith, a return crank, and an eccentric rod, of an imparting motion device including a rotary shaft having a plurality of crank elements arranged at right angles to each other, one of the crank elements being connected with the eccentric rod, a pivoted hanger supporting the rotary shaft and arranged at right angles to the line of motion of the eccentric rod, a lever connected with the piston, and means for connecting the lever with the other crank element, and a valve gear actuated by the eccentric rod.

5. The combination with a crank axle, a piston connected therewith, a return crank, and an eccentric rod, of an imparting motion device including a rotary shaft having a plurality of crank elements, one of the crank elements being connected with the eccentric rod, a lever pivoted at one end, a link or rod connecting the other end of the lever with the piston, and a link or rod connected with the other crank of the rotary shaft and with the said lever at a point intermediate of the ends thereof.

6. The combination with a crank axle, a piston connected therewith, a return crank, and an eccentric rod, of an imparting motion device including a rotary shaft having a plurality of crank elements, one of the crank elements being connected with the eccentric rod, a hanger for supporting the rotary shaft, an oscillatory lever, and links or rods connecting the oscillatory lever with the piston and with the other crank element, and a valve gear actuated by the eccentric rod.

7. In a valve gear, an imparting motion device including a rotary shaft provided with a plurality of crank elements, a lever, links or rods for connecting the lever with the piston of the locomotive and with one of the crank elements, and reciprocatory means actuated by the locomotive and connected with the other crank element, whereby motion of uniform rotative speed is secured.

8. In a valve gear, the combination with a crank axle, and a piston connected therewith, of an imparting motion device including a rotary shaft spaced from and in parallelism with the crank axle and provided with a plurality of crank elements, a depending lever pivoted at its upper end, means for connecting the lower end of the lever with the piston, a link or rod connected with one of the crank elements of the rotary shaft and with the lever at a point intermediate of the ends thereof, and reciprocatory means actuated by the locomotive and connected with the other crank element, whereby uniform rotative speed of the shaft of the imparting motion device is secured.

9. In a valve gear, the combination with a crank axle, and a piston connected therewith, of an imparting motion device including a rotary shaft spaced from and in parallelism with the crank axle and provided with a plurality of crank elements, an eccentric rod connected with one of the crank elements and with the crank axle, a lever, and means for connecting the lever with the other crank element and with the piston, whereby uniform rotative speed of the shaft of the imparting motion device is secured.

10. In a valve gear, an imparting motion device including spaced bearings, a transverse pivot arranged in the bearings, a hanger supported by the pivot and composed of two sides spaced apart at their lower ends, a rotary shaft journaled in the sides of the hanger and provided with a plurality of cranks, one of the cranks being located within the hanger, an eccentric rod connected with such crank, an oscillatory lever, and means for connecting the oscillatory lever with the other lever and with the piston of a locomotive.

11. In a valve gear, an imparting motion device including a hanger, a rotary shaft supported by the hanger and comprising spaced sections, and a plurality of cranks, one of the cranks being secured to one of the sections of the shaft, and the other crank consisting of a pair of arms connected with the sections of the shaft, and a crank pin mounted on one of the arms and secured to the other arm, an eccentric rod connected with the crank pin, a lever, and means for connecting the lever with the other crank of the rotary shaft and with one of the pistons of a locomotive.

12. In a valve gear, an imparting motion device including a rotary shaft provided with a plurality of crank elements, an eccentric rod for connecting one of the crank elements with the axle of a locomotive, and mechanism for connecting the other crank with one of the pistons of a locomotive, whereby uniform rotative speed is secured in the imparting motion device.

13. A valve gear including an eccentric arm, a rocker arm, a link connecting the rocker arm with the eccentric arm at a point intermediate of the ends thereof, means for transmitting motion from the said rocker arm to a valve, a front rocker arm located in advance of the said rocker arm, a link connecting the front rocker arm with the eccentric arm, reversing mechanism having a radius link connected with the front rocker arm, and a reciprocatory member connected with the reversing mechanism.

14. A valve gear including an eccentric rod, an eccentric arm connected with the eccentric rod, a rocker arm, a link connecting the rocker arm with the eccentric arm at a point intermediate of the ends of the latter, means for transmitting motion from the rocker arm to a valve, a front rocker arm, a link connecting the front rocker arm with the eccentric arm, reversing mechanism having a radius link also connected with the front rocker arm, and a rod connecting the reversing mechanism with the eccentric rod.

15. A valve gear including an eccentric rod, an eccentric arm, a rocker arm, a link connecting the rocker arm with the eccentric arm at a point intermediate of the ends thereof, means for transmitting motion from the rocker arm to a valve, a front rocker arm, a link connecting the front rocker arm with the forward end of the eccentric arm, a radius link also connected with the front rocker arm, a radius yoke supporting the radius link, means for oscillating the radius yoke, and means for shifting the position of the same.

16. A valve gear including an eccentric rod, an eccentric arm, a rocker arm, a link connecting the rocker arm with the eccentric arm at a point intermediate of the ends thereof, means for transmitting motion from the rocker arm to a valve, a front rocker arm, a link connecting the front rocker arm with the forward end of the eccentric arm, a radius link also connected with the front rocker arm, a radius yoke supporting the radius link, a reciprocatory member connected with the radius yoke for oscillating the same, and means for shifting the position of the radius yoke.

17. A valve gear including an eccentric arm, means connected with the eccentric arm at a point intermediate of the ends thereof for transmitting motion to a valve, a rocker arm, means for connecting the rocker arm with the forward end of the eccentric arm for causing such forward end to move through an elliptical path when the eccentric arm is reciprocated, and reverse mechanism having a radius link connected with the rocker arm.

18. A valve gear including an eccentric arm, means connected with the eccentric arm at a point intermediate of the ends thereof for transmitting motion to a valve, a rocker arm, means for connecting the rocker arm with the forward end of the eccentric arm for causing such forward end to move through an elliptical path when the eccentric arm is reciprocated, reverse mechanism having a radius link connected with the rocker arm, and a reciprocatory member connected with the eccentric arm for imparting motion to the reverse mechanism.

19. A valve gear including an eccentric arm, means connected with the eccentric arm at a point intermediate of the ends thereof for transmitting motion to a valve, a rocker arm, means for connecting the rocker arm with the forward end of the eccentric arm for causing such forward end to move through an elliptical path when the eccentric arm is reciprocated, reverse mechanism having a radius link connected with the rocker arm, and a reciprocatory member pivotally connected with the eccentric arm for imparting motion to the reverse mechanism.

20. A valve gear including an eccentric arm, a rocker arm pivoted at one end, means for connecting the other end with the forward end of the eccentric arm to cause the said forward end of the eccentric arm to move through an elliptical path, reverse mechanism having a radius link connected with the rocker arm at a point intermediate of the ends thereof, a reciprocatory member for imparting oscillatory movement to the reverse mechanism, and means connected with the eccentric arm at a point intermediate of the ends thereof for transmitting motion to a valve.

21. A valve gear including an eccentric arm, a pivoted rocker arm, a link connecting the rocker arm with the forward end of the eccentric arm to cause such forward end to move through an elliptical path when the eccentric arm is reciprocated, reverse mechanism having a radius link connected with the said rocker arm, a reciprocatory member for imparting motion to the reverse mechanism, and mechanism connected with the eccentric arm between the ends thereof for transmitting motion to a valve.

22. A valve gear comprising an eccentric arm, means connected with the eccentric arm, a pivoted rocker arm, means for connecting the rocker arm with the eccentric arm for causing the forward end thereof to move in an elliptical path when the said eccentric arm is reciprocated, and reverse mechanism including a pivotally mounted reversing yoke, an oscillatory radius yoke mounted in the reversing yoke, and a radius link carried by the radius yoke and connected with the rocker arm.

23. A valve gear comprising an eccentric arm, means connected with the eccentric arm, a pivoted rocker arm, means for connecting the rocker arm with the eccentric arm for causing the forward end thereof to move in an elliptical path when the said eccentric arm is reciprocated, and reverse mechanism including a pivotally mounted reversing yoke, a radius yoke pivotally hung in the reversing yoke, and a radius link pivoted at its lower end to the radius yoke and at its upper end to the rocker arm.

24. A valve gear comprising an eccentric arm, means connected with the eccentric arm, a pivoted rocker arm, means for connecting the rocker arm with the eccentric arm for causing the forward end thereof to move in an elliptical path when the said eccentric arm is reciprocated, and reverse mechanism including a reversing yoke having spaced sides pivotally mounted at their lower portions, a radius yoke composed of two sides pivoted at their upper ends to the upper portion of the sides of the reversing yoke, and a radius link arranged within the radius yoke and pivoted at its lower end between the lower portions of the sides of the radius yoke and connected at its upper end to the rocker arm.

25. A valve gear comprising an eccentric arm, means connected with the eccentric arm, a pivoted rocker arm, means for connecting the rocker arm with the eccentric arm for causing the forward end thereof to move in an elliptical path when the said eccentric arm is reciprocated, and reverse mechanism including a reversing yoke having spaced sides pivoted at their lower portions and provided at their upper portions with bearings, a radius yoke composed of two sides secured together at their lower ends and provided at their upper ends with journals arranged in the bearings of the reversing yoke, and a radius link carried by the radius yoke and pivoted at its lower end to the same and connected at its upper end to the rocker arm.

26. A valve gear comprising an eccentric arm, means for transmitting motion from the eccentric arm to a valve, a pivoted rocker arm, a link connecting the rocker arm with the forward end of the eccentric arm, reverse mechanism including a pivotally mounted reversing yoke, a radius yoke pivotally hung within the reversing yoke, a radius link carried by the radius yoke and pivotally connected with the same and with the rocker arm, and a reciprocatory member connected with the radius yoke for oscillating the same.

27. A valve gear including an eccentric arm, a pivoted rocker arm, a link connected to the pivoted rocker arm and to the eccentric arm at a point intermediate of the ends thereof, a second link connected with the said rocker arm, a bell crank for transmitting motion from the last-mentioned link to a valve, and reverse mechanism connected with the forward end of the eccentric arm.

28. A valve gear including an eccentric arm, a pivoted rocker arm, a link connected to the pivoted rocker arm and to the eccentric arm at a point intermediate of the ends thereof, a second link connected with the said rocker arm, a bell crank for transmitting motion from the last-mentioned link to a valve, a front pivoted rocker arm, means connected with the front rocker arm and with the eccentric arm for causing the said forward end to travel in an elliptical path when the eccentric arm is reciprocated, reverse mechanism connected with the front rocker arm, and a reciprocatory member for actuating the reverse mechanism.

29. A valve gear including an eccentric arm, a pivoted rocker arm, a link connected to the pivoted rocker arm and to the eccentric arm at a point intermediate of the ends thereof, a second link connected with the said rocker arm, a bell crank for transmitting motion from the last-mentioned link to a valve, a front rocker arm, a link connecting the front rocker arm with the forward end of the eccentric arm, reverse mechanism comprising a reversing yoke, a radius yoke pivotally hung in the reversing yoke, and a radius link carried by and pivoted to the radius yoke and connected with the rocker arm, and a reciprocatory member connected with the radius yoke for oscillating the same.

30. A valve gear comprising an eccentric arm, a pivoted rocker arm, means for connecting the forward end of the eccentric arm with the rocker arm for causing the said forward end to travel in an elliptical path, means for transmitting motion from the eccentric arm to a valve, reverse mechanism including a pivoted reversing member, a radius link connected with the rocker arm, and an oscillatory radius member pivotally supporting the radius link and pivotally hung from the reversing member, and a reciprocatory member connected with the oscillatory radius member for actuating the same.

31. A valve gear including an eccentric arm, means connected with the eccentric arm at a point between the ends thereof for transmitting motion to a valve, a rocker arm, a link connecting the rocker arm with the forward end of the eccentric arm to cause such forward end to travel in an elliptical path, and reverse mechanism connected with the said rocker arm.

32. A valve gear including an eccentric arm, a pivoted rocker arm, a link connected to the pivoted rocker arm and to the eccentric arm at a point intermediate of the ends thereof, means for transmitting motion from such rocker arm to a valve, a front rocker arm, a link connecting the front rocker arm with the forward end of the eccentric arm for causing such forward end to travel in an elliptical path, and reverse mechanism connected with the front rocker arm.

33. A valve gear including an eccentric arm, means connected with the eccentric arm at a point between the ends thereof for transmitting motion to a valve, a rocker arm, means for connecting the rocker arm with the forward end of the eccentric arm to cause such forward end to travel in an elliptical path, and reverse mechanism connected with the said rocker arm.

34. The combination with a valve gear, of an imparting motion device connected with and carried by the frame of the locomotive and including a rotary shaft, and a pair of crank elements arranged at an angle to each other, means for connecting the crank elements with separate moving parts of an engine to secure uniform rotative speed of the imparting motion device, and an eccentric arm or rod for transmitting motion from the imparting motion device to the valve gear.

35. The combination of a valve gear including an eccentric arm or rod, an imparting motion device connected with the eccentric arm or rod and comprising a rotary shaft connected with and carried by the frame of the locomotive and provided with crank elements arranged at an angle, and means for connecting the crank elements with separate parts of an engine to secure uniform rotative speed.

36. The combination of an imparting motion device including a rotary shaft connected with and carried by the frame of the locomotive and provided with crank elements arranged at an angle to each other, means for connecting the crank elements with separate parts of an engine to secure uniform rotative speed, and means for transmitting motion from the imparting motion device to a valve gear.

In testimony, that I claim the foregoing as my own, I have hereto affixed my signature in the presence of two witnesses.

HENRY J. PILLIOD.

Witnesses:
CARL W. HUNT,
HARRY DE JOANNIS.